(12) United States Patent
Cheon et al.

(10) Patent No.: US 12,365,322 B2
(45) Date of Patent: Jul. 22, 2025

(54) ELECTRO-HYDRAULIC BRAKE AND CONTROL METHOD THEREFOR

(71) Applicant: HYUNDAI MOBIS CO., LTD., Seoul (KR)

(72) Inventors: Se Young Cheon, Suwon-si (KR); Jae Woong Hur, Seongnam-si (KR); Jae Il Lim, Yongin-si (KR); Dong Goo Kim, Suwon-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 407 days.

(21) Appl. No.: 17/880,775

(22) Filed: Aug. 4, 2022

(65) Prior Publication Data
US 2023/0042679 A1 Feb. 9, 2023

(30) Foreign Application Priority Data
Aug. 6, 2021 (KR) .................. 10-2021-0104058

(51) Int. Cl.
*B60T 8/48* (2006.01)
*B60Q 9/00* (2006.01)
(Continued)

(52) U.S. Cl.
CPC .................. *B60T 8/94* (2013.01); *B60Q 9/00* (2013.01); *B60T 8/4827* (2013.01); *B60T 17/22* (2013.01); *H01M 10/425* (2013.01); *H01M 10/44* (2013.01); *H01M 10/482* (2013.01); *H01M 10/486* (2013.01); *H01M 50/583* (2021.01); *H02J 7/0029* (2013.01);
(Continued)

(58) Field of Classification Search
CPC . B60T 8/48; B60T 8/4827; B60T 8/94; B60T 17/22; B60T 17/221; B60T 2220/04; B60T 2270/414
See application file for complete search history.

(56) References Cited

U.S. PATENT DOCUMENTS 9,776,607 B2 * 10/2017 Brenn .................. B60T 8/321
9,873,414 B2 * 1/2018 Förster ................. B60T 7/122
(Continued)

*Primary Examiner* — Thomas J Williams
(74) *Attorney, Agent, or Firm* — NovoTechIP International PLLC

(57) ABSTRACT

According to at least one embodiment, the present disclosure provides an electro-hydraulic brake comprising: a main brake unit configured to provide braking hydraulic pressure to a plurality of wheel cylinders by driving a motor; an auxiliary brake unit connected to the main brake unit to be filled with high-pressure braking hydraulic pressure, and configured to provide braking hydraulic pressure to the plurality of wheel cylinders when an operation error of the main brake unit occurs; a main battery configured to supply power to the main brake unit and the auxiliary brake unit; and an auxiliary battery configured to supply power to the auxiliary brake unit when the main battery fails, wherein the auxiliary brake unit comprises an auxiliary brake control unit that controls charging and discharging of the auxiliary battery, and a power module that monitors a state of the main battery and transmits the state to the auxiliary brake control unit, and a battery management module that monitors a state of charge (SOC) of the auxiliary battery and transmits the state of charge to the auxiliary brake control unit.

18 Claims, 4 Drawing Sheets

(51) Int. Cl.
*B60T 8/94* (2006.01)
*B60T 17/22* (2006.01)
*H01M 10/42* (2006.01)
*H01M 10/44* (2006.01)
*H01M 10/48* (2006.01)
*H01M 50/583* (2021.01)
*H02J 7/00* (2006.01)

(52) U.S. Cl.
CPC ......... *H02J 7/0048* (2020.01); *B60T 2220/04* (2013.01); *B60T 2270/402* (2013.01); *B60T 2270/414* (2013.01); *H01M 2010/4271* (2013.01); *H01M 2200/103* (2013.01); *H01M 2220/20* (2013.01)

(56) References Cited

U.S. PATENT DOCUMENTS

| | | | | |
|---|---|---|---|---|
| 10,821,949 | B2 * | 11/2020 | Henriques | B60T 7/042 |
| 2009/0088993 | A1 * | 4/2009 | Oohasi | B60L 3/0092 |
| | | | | 702/63 |
| 2009/0091180 | A1 * | 4/2009 | Iwasaki | B60T 8/90 |
| | | | | 303/11 |
| 2015/0151726 | A1 * | 6/2015 | McClain | B60T 8/92 |
| | | | | 303/15 |
| 2017/0282877 | A1 * | 10/2017 | Besier | B60T 8/885 |
| 2019/0168724 | A1 * | 6/2019 | VandenBerg, III | B60T 8/171 |
| 2020/0209321 | A1 * | 7/2020 | Min | H02J 7/0031 |
| 2020/0269699 | A1 * | 8/2020 | Nakanishi | B60L 58/18 |
| 2020/0324744 | A1 * | 10/2020 | Mizusaki | B60T 13/686 |
| 2021/0175729 | A1 * | 6/2021 | Rea | H01M 10/425 |
| 2023/0042679 | A1 * | 2/2023 | Cheon | H01M 10/44 |

* cited by examiner

ELECTRO-HYDRAULIC BRAKE AND CONTROL METHOD THEREFOR

CROSS-REFERENCE TO RELATED APPLICATIONS

This application is based on, and claims priority from, Korean Patent Application Number 10-2021-0104058, filed Aug. 6, 2021, the disclosure of which is incorporated by reference herein in its entirety.

TECHNICAL FIELD

The present disclosure relates to an electro-hydraulic brake system and a control method therefor.

BACKGROUND

The description in this section merely provides background information related to the present disclosure and does not necessarily constitute the related art.

Electro-hydraulic brakes use an electric motor to generate hydraulic pressure. Electro-hydraulic brakes transmit hydraulic pressure to wheel cylinders to generate braking force in each wheel cylinder. The electro-hydraulic brake makes it easy to individually control the braking force generated by each wheel cylinder. Accordingly, the electro-hydraulic brake may easily implement functions such as Electronic Stability Control System (ESC) or Anti-Lock Brake System (ABS).

Electro-hydraulic brakes have a high risk of failure because many parts are made up of electronic equipment. When the electro-hydraulic brake fails while a vehicle is driving, there is a risk of a major accident. Accordingly, a redundancy system may be necessary that allows an auxiliary braking system to operate when the main braking system of the electro-hydraulic brake does not operate normally.

Even when a redundancy system is implemented by adding the auxiliary braking system to the main braking system, the main braking system and the auxiliary braking system share a single power source. When a failure occurs in the main braking system, braking force may be generated in a vehicle using the auxiliary braking system. However, when a power failure occurs in the vehicle, a situation may arise in which not only the main braking system but also the auxiliary braking system do not operate normally. In a redundancy situation, when the auxiliary braking system does not operate normally or its performance is degraded, it may not be able to supply the required braking force to a vehicle and a major accident may occur.

SUMMARY

According to at least one embodiment, the present disclosure provides an electro-hydraulic brake system comprising: a main brake unit configured to provide braking hydraulic pressure to a plurality of wheel cylinders by driving a motor; an auxiliary brake unit connected to the main brake unit to be filled with high-pressure braking hydraulic pressure, and configured to provide braking hydraulic pressure to the plurality of wheel cylinders when an operation error of the main brake unit occurs; a main battery configured to supply power to the main brake unit and the auxiliary brake unit; and an auxiliary battery configured to supply power to the auxiliary brake unit when the main battery fails, wherein the auxiliary brake unit comprises an auxiliary brake control unit that controls charging and discharging of the auxiliary battery, and a power module that monitors a state of the main battery and transmits the state to the auxiliary brake control unit, and a battery management module that monitors a state of charge (SOC) of the auxiliary battery and transmits the state of charge to the auxiliary brake control unit.

According to at least one embodiment, the present disclosure provides a method for controlling an electro-hydraulic brake of a vehicle, the method comprising: an inspection process of inspecting states of a main battery and an auxiliary battery using a power module and a battery management module; a determination process of transmitting the states of the main battery and the auxiliary battery to an auxiliary brake control unit to determine a failure; a failure control process of controlling to perform a failure mode when a failure of the main battery or the auxiliary battery occurs; and a normal control process of controlling to perform a normal mode when the main battery and the auxiliary battery are normal.

DETAILED DESCRIPTION

Figure 1:
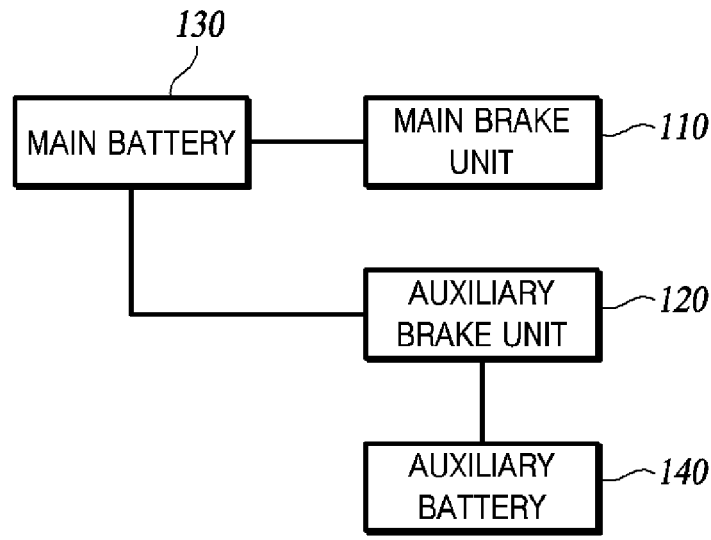
FIG. 1 is a block diagram of an electro-hydraulic brake system according to an embodiment of the present disclosure.

The electro-hydraulic brake or electro-hydraulic brake system according to an embodiment includes a separate auxiliary power supply to operate an auxiliary braking system normally by using the auxiliary power supply even when a failure occurs in a main power supply of a vehicle.

The aspects of the present disclosure are not limited to the foregoing, and other aspects not mentioned herein will be able to be clearly understood by those skilled in the art from the following description.

Hereinafter, some embodiments of the present disclosure will be described in detail with reference to the accompanying drawings. In the following description, like reference numerals preferably designate like elements, although the elements are shown in different drawings. Further, in the following description of some embodiments, a detailed description of related known components and functions when considered to obscure the subject of the present disclosure will be omitted for the purpose of clarity and for brevity.

Additionally, alphanumeric codes such as first, second, i), ii), (a), (b), etc., in numbering components are used solely for the purpose of differentiating one component from the other but not to imply or suggest the substances, the order, or sequence of the components. Throughout this specification, when parts "include" or "comprise" a component, they are meant to further include other components, not excluding thereof unless there is a particular description contrary thereto. The terms such as 'unit,' 'module,' and the like refer to one or more units for processing at least one function or operation, which may be implemented by hardware, software, or a combination thereof.

FIG. 1 is a block diagram of an electro-hydraulic brake according to an embodiment of the present disclosure.

Referring to FIG. 1, an electro-hydraulic brake 100 may include a main brake unit 110, an auxiliary brake unit 120, a main battery 130, and an auxiliary battery 140.

The main brake unit 110 is connected to the main battery 130 and receives power from the main battery 130. The auxiliary brake unit 120 is connected to the main battery 130 and receives power from the main battery 130. In addition, the auxiliary brake unit 120 is connected to the auxiliary battery 140 and receives power from the auxiliary battery 140 when the main battery 130 fails.

The main brake unit 110 provides braking hydraulic pressure to a plurality of wheel cylinders by driving a motor. The auxiliary brake unit 120 is connected to the main brake unit 110 to be filled with high-pressure braking hydraulic pressure. The auxiliary brake unit 120 provides braking hydraulic pressure to the plurality of wheel cylinders when an operation error or failure of the main brake unit 110 occurs. When an operation error occurs in the main brake unit 110, the high-pressure braking hydraulic pressure stored in the auxiliary brake unit 120 is quickly supplied to the wheel cylinder to enable emergency braking. Due to an operation error of the main brake unit 110, an operation error of various valves controlling a hydraulic circuit or inability to drive a motor may occur.

The main brake unit 110 may include all or part of a pedal cylinder, a master cylinder, a hydraulic unit, a hydraulic connection unit, and a plurality of valves.

The auxiliary brake unit 120 may include all or part of an auxiliary hydraulic unit, an auxiliary accumulator, an auxiliary detour unit, an auxiliary sensing unit, and a plurality of valves.

The configuration and control method of the hydraulic circuit of the main brake unit 110 and the auxiliary brake unit 120 are not limited to a specific embodiment, and since it is a technique known to those skilled in the art related to the present disclosure, a detailed description thereof will be omitted.

Figure 2:
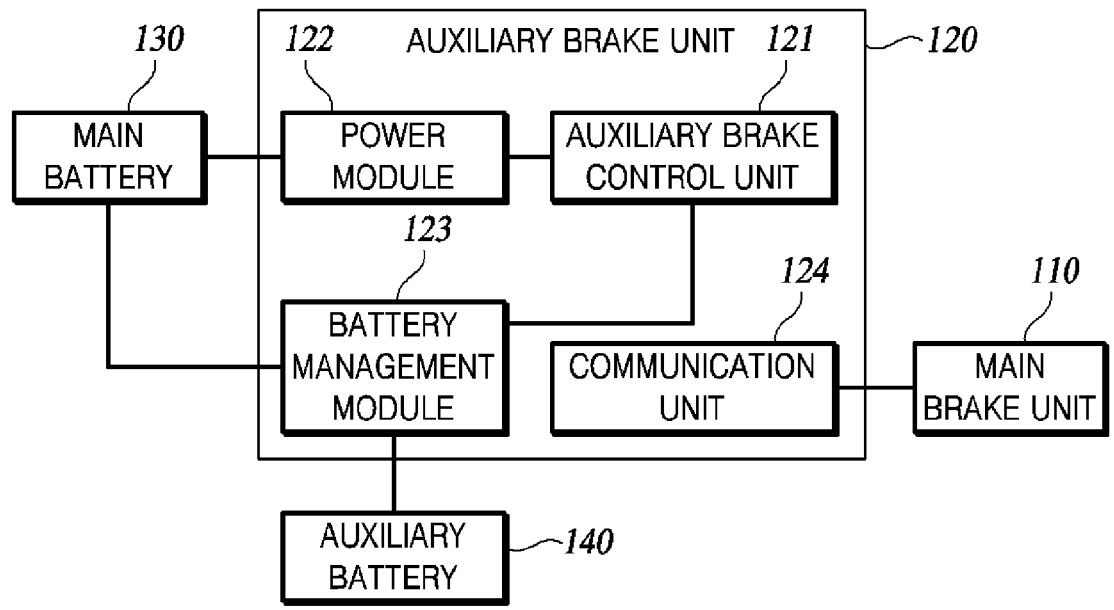
FIG. 2 is a block diagram illustrating an auxiliary brake unit of an electro-hydraulic brake according to an embodiment of the present disclosure.

FIG. 2 is a block diagram illustrating an auxiliary brake unit of an electro-hydraulic brake according to an embodiment of the present disclosure.

Referring to FIG. 2, the electro-hydraulic brake 100 may include an auxiliary brake control unit 121, a power module 122, a battery management module 123 (BMS), and a communication unit 124.

The power module 122 may monitor and control the current state of the main battery 130. The power module 122 may monitor the current and voltage states of the main battery 130. The power module 122 may transmit the state of the main battery 130 to the auxiliary brake control unit 121. The power module 122 may be used by distributing power. The main battery 130 transmits power to the power module 122 using Vbat1 and Vbat2. The power module 122 may include a switch. The switch enables switching of power between the main battery 130 and the auxiliary battery 140.

The battery management module 123 may monitor and control the auxiliary battery 140. The battery management module 123 may monitor the current, temperature, balance, and state of charge (SOC) of the auxiliary battery 140. In this connection, the balance refers to a power balance of the auxiliary battery 140. The battery management module 123 may transmit the state of the auxiliary battery 140 to the auxiliary brake control unit 121. In order to prevent overcurrent when power is output, the battery management module 123 may include a circuit. The battery management module 123 may include a fuse. The fuse prevents short-circuit.

The auxiliary brake control unit 121 commands the power module 122 to control the main battery 130 by using the information received from the power module 122. The auxiliary brake control unit 121 commands the battery management module 123 to control the auxiliary battery 140 by using the information received from the battery management module 123. The auxiliary brake control unit 121 may give a switching command between the main battery 130 and the auxiliary battery 140 to the power module 122. In this connection, the auxiliary brake control unit 121 may be a micro control unit (MCU).

The auxiliary brake control unit 121 manages a charge amount of the auxiliary battery 140 by using the charge state information of the auxiliary battery 140. In order not to run out of power of the auxiliary battery 140 when the main battery 130 fails, the auxiliary brake control unit 121 manages the charge amount of the auxiliary battery 140. The auxiliary brake control unit 121 controls charging and discharging of the auxiliary battery 140 using the battery management module 123. The main battery 130 supplies power to the battery management module 123 using Vbat2 and charges the auxiliary battery 140. Charging of the auxiliary battery 140 is stopped during braking of a vehicle. However, when a failure occurs in the main battery 130, power is output to the battery management module 123 regardless of whether the vehicle is braked.

When a failure occurs in the main battery 130, the auxiliary brake control unit 121 may notify a driver with a danger warning light of a braking device. When a failure occurs in the main battery 130, the auxiliary brake control unit 121 may display a braking possible range using the auxiliary battery 140.

The communication unit 124 may support communication between the main brake unit 110 and the auxiliary brake unit 120. The electro-hydraulic brake 100 may use the communication unit 124 to switch braking to the auxiliary brake unit 120 when the main brake unit 110 fails.

The electro-hydraulic brake 100 may include a first pedal sensor and a second pedal sensor. The main brake unit 110 receives an intention of a driver to brake using the first pedal sensor. The auxiliary brake unit 120 receives an intension of a driver to brake by using the second pedal sensor. By using the second pedal sensor, the auxiliary brake unit 120 may receive an intention of a driver to brake even when the main brake unit 110 fails.

Figure 3:
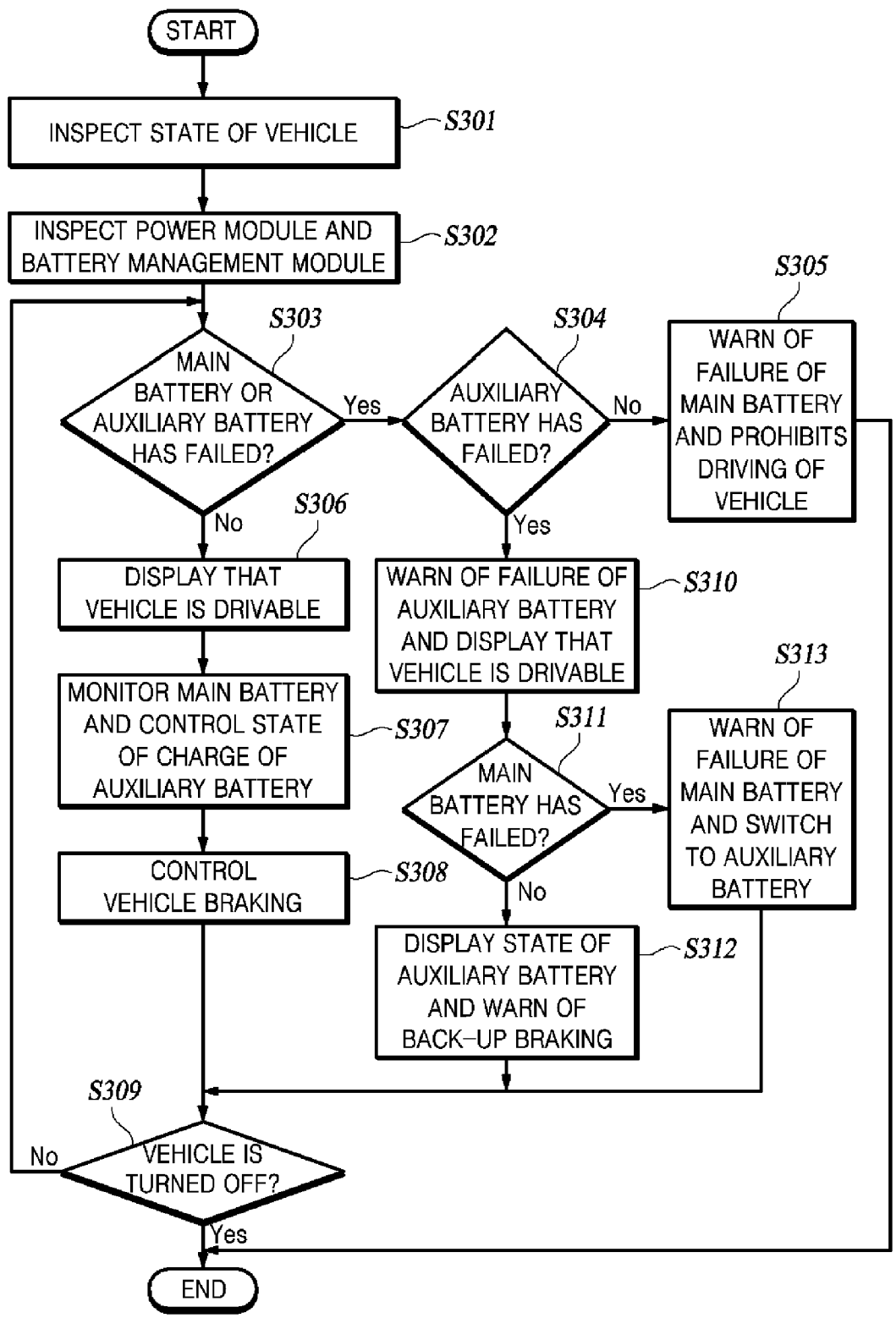
FIG. 3 is a flowchart illustrating a method for controlling an electro-hydraulic brake auxiliary brake control unit according to an embodiment of the present disclosure.

FIG. 3 is a flowchart illustrating a method for controlling an electro-hydraulic brake auxiliary brake control unit according to an embodiment of the present disclosure.

Referring to FIG. 3, when a driver starts a vehicle, the auxiliary brake control unit 121 inspects the state of the vehicle (S301). Here, the inspection of the state of the vehicle may include inspecting the state of not only a braking device but also controllers essential for vehicle control.

The auxiliary brake control unit 121 inspects the states of the power module 122 and the battery management module 123 (S302). In the inspection of the power module 122 and the battery management module 123, it is determined whether the main battery 130 or the auxiliary battery 140 has failed (S303). When the main battery 130 or the auxiliary battery 140 fails, the auxiliary brake control unit 121 performs a control operation corresponding to a failure mode. The auxiliary brake control unit 121 determines whether the auxiliary battery 140 has failed (S304). When the auxiliary battery 140 does not fail, but the main battery 130 fails, the auxiliary brake control unit 121 warns a driver of the failure of the main battery 130 and prohibits driving of a vehicle (S305).

When only the auxiliary battery 140 fails, the auxiliary brake control unit 121 warns a driver of the failure of the auxiliary battery 140 and displays that a vehicle may be driven (S310). When only the auxiliary battery 140 fails, the vehicle may be driven, but the power module 122 continuously monitors the main battery 130. The auxiliary brake control unit 121 may determine whether the main battery 130 has failed while the vehicle is driving (S311). When only the main battery 130 fails, the auxiliary brake control unit 121 may display the state of the auxiliary battery 140 and warn a driver of a back-up braking state (S312).

When the main battery 130 fails, the auxiliary brake control unit 121 may warn a driver of a failure of the main battery 130 (S313). The auxiliary brake control unit 121 may control a vehicle using the auxiliary battery 140. The auxiliary brake control unit 121 may control to change the power to the auxiliary battery 140 and display a SOC of the auxiliary battery to the driver (S313). The auxiliary brake control unit 121 may display a state in which braking is possible to the driver and induce the driver to stop.

When there is no failure in either the main battery 130 and the auxiliary battery 140, the auxiliary brake control unit 121 displays to a driver that a vehicle is in a drivable state (S306). The auxiliary brake control unit 121 monitors the main battery 130 using the power module 122 (S307). The auxiliary brake control unit 121 controls a SOC of the auxiliary battery 140 by using the battery management module 123 (S307). In a vehicle braking situation, the auxiliary brake control unit 121 performs braking control using the main battery 130 (S308).

When a vehicle is not turned off, the process returns to S303 to continuously monitor the states of the main battery 130 and the auxiliary battery 140 and perform this algorithm until the vehicle is turned off (S309). When the vehicle is turned off, this algorithm ends.

Figure 4:
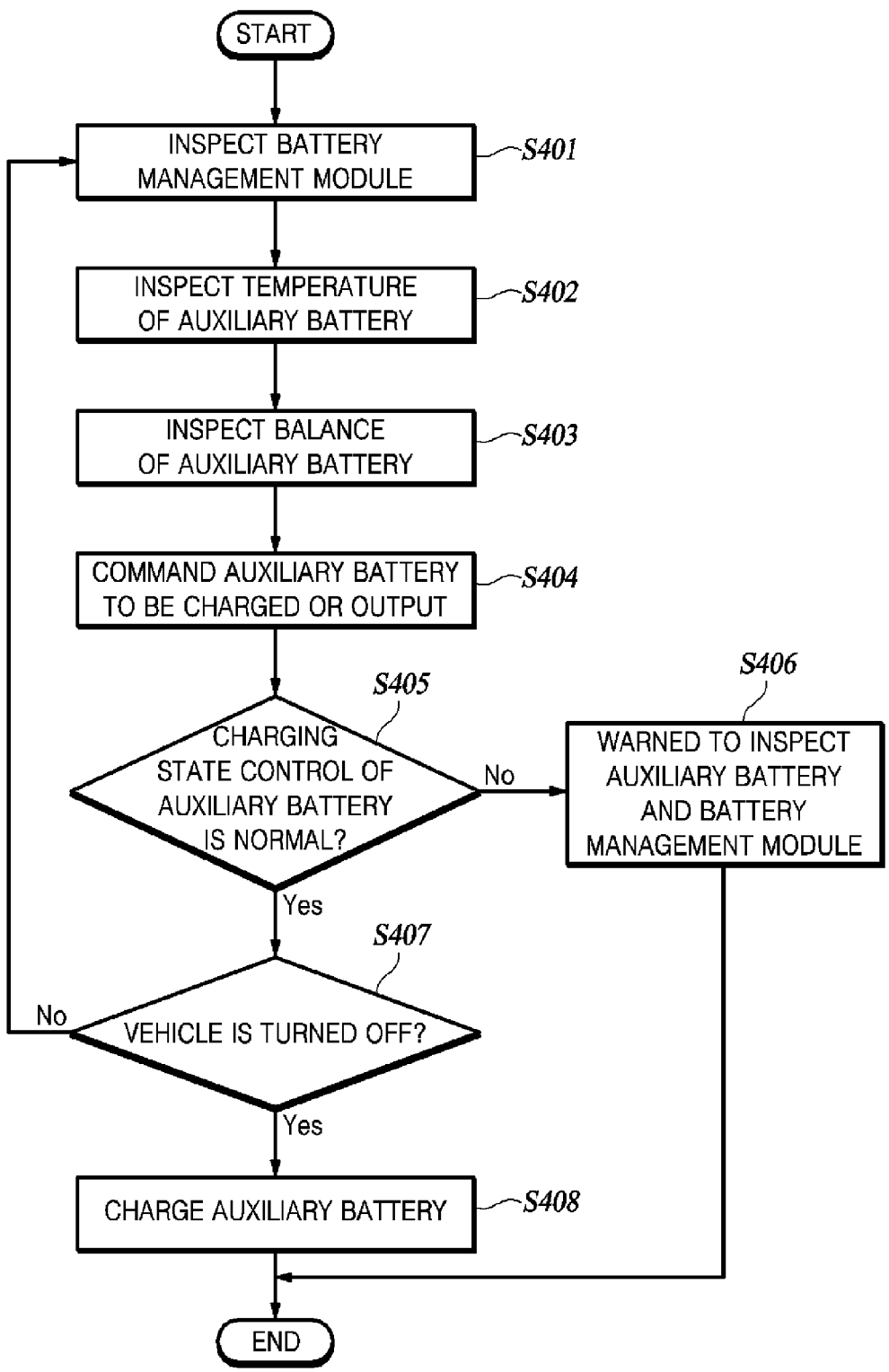
FIG. 4 is a flowchart illustrating a method for controlling an electro-hydraulic brake battery management module according to an embodiment of the present disclosure.

FIG. 4 is a flowchart illustrating a method for controlling an electro-hydraulic brake battery management module according to an embodiment of the present disclosure.

Referring to FIG. 4, the auxiliary brake control unit 121 may inspect the battery management module 123 (S401). The auxiliary brake control unit 121 may inspect the current, temperature, balance, and SOC of the auxiliary battery 140 as well as imperfections of the battery management module 123 itself.

The auxiliary brake control unit 121 inspects the temperature of the auxiliary battery 140 using the battery management module 123 (S402). When the temperature of the auxiliary battery 140 is outside of a preset temperature range, charging of the auxiliary battery 140 is stopped. When the temperature of the auxiliary battery 140 is within a preset temperature range, the auxiliary battery 140 is charged.

The auxiliary brake control unit 121 inspects the balance of the auxiliary battery 140 using the battery management module 123 (S403). Here, the balance of the auxiliary battery 140 refers to a voltage balance of the auxiliary battery 140. When the balance of the auxiliary battery 140 is outside of a preset range, charging of the auxiliary battery 140 is stopped. When the balance of the auxiliary battery 140 is within a preset range, the auxiliary battery 140 is charged.

When there is no abnormality in the temperature and balance of the auxiliary battery 140, the auxiliary brake control unit 121 commands the auxiliary battery 140 to be charged or output (S404). When the auxiliary battery 140 is used to output the output to the auxiliary brake unit 120, the battery management module 123 controls so that overcurrent does not occur.

When the auxiliary battery 140 is charged, it is checked whether the charging state control of the auxiliary battery 140 is normally performed (S405). When the charging state control of the auxiliary battery 140 is abnormal, the auxiliary battery 140 and the battery management module 123 are inspected (S406). A driver is warned to inspect the auxiliary battery 140 and the battery management module 123 (S406). When the charging state control of the auxiliary battery 140 is normal, it is checked whether a vehicle is turned off (S407). When the vehicle is turned off, the auxiliary brake control unit 121 charges the auxiliary battery 140 up to a preset range (S408). When the auxiliary battery 140 is charged, this algorithm ends.

Figure 5:
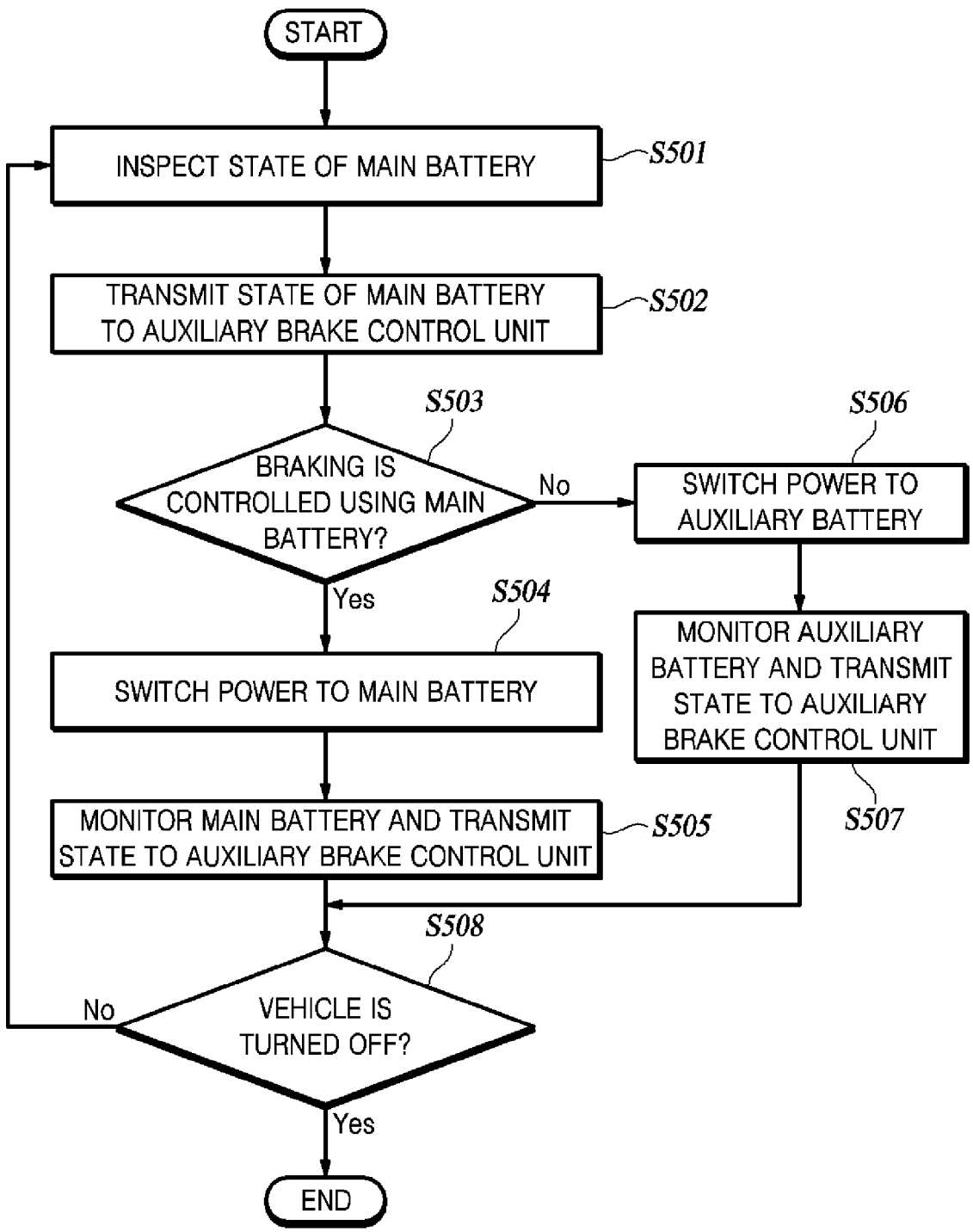
FIG. 5 is a flowchart illustrating a method for controlling an electro-hydraulic brake power module according to an embodiment of the present disclosure.

FIG. 5 is a flowchart illustrating a method for controlling an electro-hydraulic brake power module according to an embodiment of the present disclosure.

Referring to FIG. 5, the auxiliary brake control unit 121 may inspect the state of the main battery 130 by using the power module 122 (S501). The power module 122 transmits the state of the main battery 130 to the auxiliary brake control unit 121 (S502). The auxiliary brake control unit 121 determines whether a vehicle controls braking using the main battery 130 (S503).

When braking is controlled using the main battery 130, the power module 122 switches power to the main battery 130 (S504). The power module 122 monitors the state of the main battery 130 and transmits the same to the auxiliary brake control unit 121 (S505).

When braking is controlled using the auxiliary battery 140, the power module 122 switches power to the auxiliary battery 140 (S506). The power module 122 monitors the state of the auxiliary battery 140 and transmits the same to the auxiliary brake control unit 121 (S507).

This algorithm is repeated while a vehicle is driving (S508). When the vehicle is turned off, this algorithm ends.

According to an embodiment, the electro-hydraulic brake includes a separate auxiliary power supply, so that a vehicle can be normally braked using the auxiliary power supply even in the case of a failure of a main braking system as well as a failure of a main power supply of a vehicle.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand that the scope of the claimed invention is not to be limited by the above explicitly described embodiments but by the claims and equivalents thereof.

What is claimed is:

1. An electro-hydraulic brake system of a vehicle, comprising:
   a main brake unit configured to provide a braking hydraulic pressure to a plurality of wheel cylinders;

an auxiliary brake unit connected to the main brake unit and configured to provide the braking hydraulic pressure to the plurality of wheel cylinders when a failure occurs to the main brake unit;
a main battery configured to supply power to the main brake unit and the auxiliary brake unit; and
an auxiliary battery configured to supply power to the auxiliary brake unit when a failure occurs to the main battery, the auxiliary battery comprising:
an auxiliary brake control unit configured to control charging and discharging of the auxiliary battery;
a power module configured to monitor a state of the main battery and transmit the monitored state of the main battery to the auxiliary brake control unit; and
a battery management module configured to monitor a state of charge (SOC) of the auxiliary battery and transmit the monitored SOC of the auxiliary battery to the auxiliary brake control unit,
wherein the auxiliary brake control unit is configured to stop charging the auxiliary battery when the vehicle is braking.

2. The electro-hydraulic brake system of claim 1, wherein the auxiliary brake unit further comprises a communication unit connected between the auxiliary brake unit and the main brake unit.

3. The electro-hydraulic brake system of claim 1, further comprising a pedal sensor configured to allow the auxiliary brake unit to receive a driver's braking intention when the failure occurs to the main brake unit.

4. The electro-hydraulic brake system of claim 1, further comprising a switch configured to switch supplying of the power between the main battery and the auxiliary battery.

5. The electro-hydraulic brake system of claim 1, wherein the power module is configured to:
monitor a current or voltage of the main battery; and
transmit, to the auxiliary brake control unit, the monitored current or voltage of the main battery.

6. The electro-hydraulic brake system of claim 1, wherein the battery management module is configured to:
monitor one or more of a current, temperature and balance of the auxiliary battery; and
transmit, to the auxiliary brake control unit, the monitored one or more of the current, temperature and balance of the auxiliary battery.

7. The electro-hydraulic brake system of claim 1, wherein the battery management module comprises at least one of an overcurrent prevention circuit and a short-circuit prevention fuse.

8. The electro-hydraulic brake system of claim 1, wherein the auxiliary brake control unit is configured to:
receive the state of the main battery and the SOC of the auxiliary battery from the power module and the battery management module, respectively; and
select the main battery or the auxiliary battery to supply the power to the auxiliary brake unit.

9. The electro-hydraulic brake system of claim 1, wherein, when the failure occurs to the main battery, the auxiliary brake control unit is configured to supply the power to the battery management module regardless of whether the vehicle is braking.

10. A method for operating an electro-hydraulic brake system of a vehicle, the method comprising:
inspecting states of a main battery and an auxiliary battery;
determining, based on the inspected states of the main and auxiliary batteries, whether a failure has occurred to the main or auxiliary battery;
in response to determining that the failure has occurred to the main or auxiliary battery, controlling the electro-hydraulic brake system to operate in a failure mode; and
in response to determining that no failure has occurred to the main or auxiliary battery, controlling the electro-hydraulic brake system to operate in a normal mode,
wherein controlling the electro-hydraulic brake system to operate in the normal comprises, when the vehicle is braked, stopping charging the auxiliary battery and determining whether the failure has occurred to the main battery.

11. The method of claim 10, wherein determining whether the failure has occurred to the main or auxiliary battery comprises:
determining whether a voltage at the main battery is within a preset voltage range; and
in response to determining that the voltage at the main battery is not within the preset voltage range, determining that the failure has occurred to the main battery.

12. The method of claim 10, wherein inspecting the state of the auxiliary battery comprises inspecting at least one of a current, temperature, balance and charge amount of the auxiliary battery.

13. The method of claim 10, wherein controlling the electro-hydraulic brake system to operate in the failure mode comprises, in response to determining that the failure has occurred to the main battery, prohibiting driving of the vehicle and displaying a warning light.

14. The method of claim 10, wherein controlling the electro-hydraulic brake system to operate in the failure mode comprises, in response to determining that the failure has occurred to the auxiliary battery, outputting an auxiliary battery failure warning and allowing driving of the vehicle.

15. The method of claim 10, wherein controlling the electro-hydraulic brake system to operate in the normal mode comprises allowing driving of the vehicle, monitoring the main battery while the vehicle is driving, and controlling a charging state of the auxiliary battery.

16. The method of claim 10, further comprising, in response to determining that the failure has occurred to the main battery while the vehicle is driving, performing:
outputting a warning that the failure has occurred to the main battery; and
controlling, using the auxiliary battery, an auxiliary brake unit.

17. The method of claim 16, further comprising, in response to determining that the failure has occurred to the main battery while the vehicle is driving, performing:
displaying a state of charge of the auxiliary battery; and
displaying a warning light.

18. The method of claim 10, further comprising, in response to determining that the failure has occurred to the auxiliary battery while the vehicle is driving, displaying a state of the auxiliary battery and a backup braking warning.

* * * * *